US009604162B2

(12) United States Patent
Hoefken et al.

(10) Patent No.: US 9,604,162 B2
(45) Date of Patent: Mar. 28, 2017

(54) ROTARY DISC FILTER DEVICE

(71) Applicant: Advanced Filtration Technologies Inc., Tallahassee, FL (US)

(72) Inventors: Marcus Hoefken, Erlangen (DE); Thomas Hagspiel, Postbauer-Heng (DE)

(73) Assignee: ADVANCED FILTRATION TECHNOLOGIES INC., Tallahassee, FL (US)

( * ) Notice: Subject to any disclaimer, the term of this patent is extended or adjusted under 35 U.S.C. 154(b) by 360 days.

(21) Appl. No.: 14/251,356

(22) Filed: Apr. 11, 2014

(65) Prior Publication Data

US 2015/0290564 A1    Oct. 15, 2015

(51) Int. Cl.
| B01D 33/067 | (2006.01) |
| B01D 33/50 | (2006.01) |
| B01D 33/23 | (2006.01) |
| B01D 33/76 | (2006.01) |

(52) U.S. Cl.
CPC ........ B01D 33/067 (2013.01); B01D 33/23 (2013.01); B01D 33/50 (2013.01); B01D 33/763 (2013.01)

(58) Field of Classification Search
CPC ...... B01D 33/067; B01D 33/23; B01D 33/50; B01D 33/763; B01D 33/15; B01D 33/21
USPC ....... 210/331, 346, 224–231, 461, 495, 486, 210/497.3, 498
See application file for complete search history.

(56) References Cited

U.S. PATENT DOCUMENTS

| 1,446,448 A * | 2/1923 | Brown ............... B01D 33/0048 210/216 |
| 2,894,632 A | 7/1959 | Myers |
| 4,626,351 A | 12/1986 | Fuhring |
| 7,972,508 B2 | 7/2011 | Danielsson et al. |

FOREIGN PATENT DOCUMENTS

| CH | 351947 A | 2/1961 |
| DE | 295942 C | 1/1915 |
| EP | 2514500 A1 | 10/2012 |

OTHER PUBLICATIONS

PCT/IPEA/416, "Notification of Transmittal of the International Preliminary Report on Patentability for International Application No. PCT/EP2015/057027," Jul. 29, 2015.
PCT/IPEA/408, "Written Opinion of the International Preliminary Examining Authority for International Application No. PCT/EP2015/057027," Apr. 29, 2016.

* cited by examiner

Primary Examiner — Madeline Gonzalez
(74) Attorney, Agent, or Firm — Manabu Kanesaka (57) ABSTRACT

A rotary disc filter device includes a rotor rotatable about an axis of rotation, having a plurality of disc-shaped filter members. Each disc-shaped filter member has two walls extending outwardly form the axis of rotation. At least one of the walls has the form of a frustum.

12 Claims, 11 Drawing Sheets

Fig.1

PRIOR ART

ROTARY DISC FILTER DEVICE

FIELD OF THE INVENTION

The present invention relates to a rotary disc filter device comprising a rotor rotatable about an axis of rotation, the rotor comprising a plurality of disc-shaped filter members, each disc-shaped filter member having two walls extending outwardly from the axis of rotation.

BACKGROUND ART

Filtering devices, for instance rotary disc filter devices, are used especially for filtering off particles from liquids.

Figure 1:
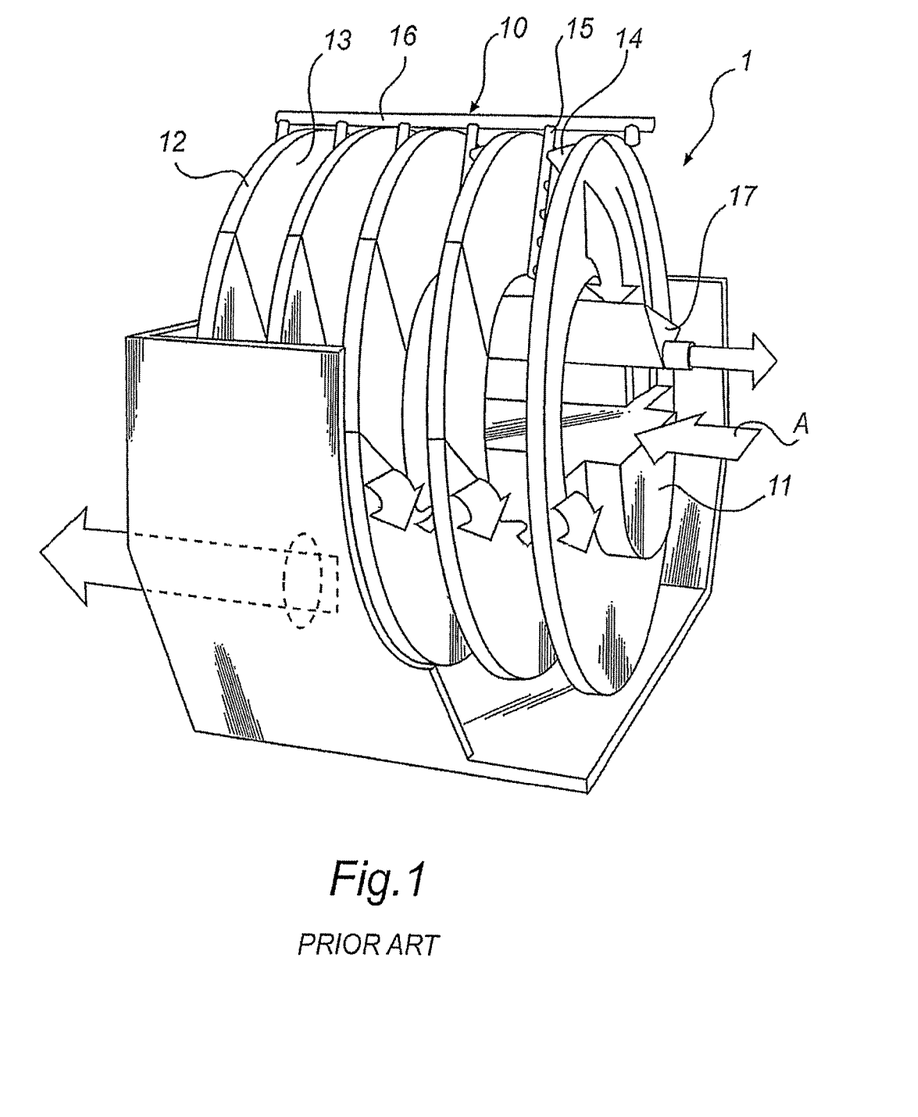
FIG. 1 is a perspective view which schematically illustrates the principal of a rotary disc filter device according to the prior art.

A common rotary disc filter is disclosed, for instance, in SE-C-224 131 and the principle thereof is illustrated in FIG. 1. The rotary disc filter 1 comprises a rotor having a horizontal, slowly rotating drum 11, which supports a number of parallel, disc-shaped filter members 12 which are successively arranged in spaced-apart relationship along the center axis of the drum 11 and which extend radially away from the drum (just partly shown in FIG. 1). The disc-shaped filter members 12 have, on their parallel orientated opposite lateral surfaces, openings which are covered with a filter cloth 13. Each rotary disc filter member 12 has a central opening through which a liquid A which is to be filtered can flow to the interior of the disc-shaped filter member 12. The liquid A is conducted through an inlet into the drum 11 and falls down to the interior of the disc-shaped filter members 12, from which liquid A continues to flow out through the filter cloth 13 so that the particles which are to be filtered off adhere at the inside of the filter cloth 13.

The rotary disc filter 1 can be cleaned by backwashing by means of a cleaning device of the type described, for instance, in WO 00/37159. This filter cleaning device is provided with spray nozzles 14 which are mounted on a plurality of fixed flush tubes 15, which project between the disc-shaped filter members 12. The flush tubes 15 are adapted to conduct flushing liquid to the spray nozzles 14 and are connected to an elongate liquid-conducting tube 16 which extends parallel to the centre axis of the drum 11. The spray nozzles 14 spray liquid onto the filter cloth 13 axially from outside, in a direction opposite the filtering direction and flushed-off particles are collected in a discharge duct 17 which is placed inside the drum 11 above the inlet.

U.S. Pat. No. 7,972,508 B2 discloses a rotary disc filter including a plurality of disc-shaped filter members secured about a drum. Each disc-shaped filter member has parallel orientated opposite lateral surfaces. The disc-shaped filter member is made of a plurality of modular frame members secured on the drum.

The rotary disc filter devices according to the prior art have a voluminous design. Further, the construction of the rotor is complicated or requires the expensive manufacture of specific parts. Furthermore, the rotors according to the prior art are relatively heavy in weight. In order to support such a rotor, it is necessary to provide a supporting structure having a high stability. Such a supporting structure is expensive in manufacture.

It is desirable to reduce the volume of a rotary disc filter device. It would also be desirable to reduce the cost of manufacture of a rotary disc filter device.

SUMMARY OF THE INVENTION

An object of the present invention is to suggest a solution to the above problems by providing an improved rotary disc filter device.

A specific object is to provide a rotary disc filter device which has a compact design and which requires less effort and cost in manufacture.

According to the invention, these objects are achieved by a rotary disc filter device comprising the features of the first aspect, with preferred embodiments in other aspects.

In the inventive rotary disc filter device, at least one of the walls of the disc-shaped filter member has a form of a frustum. In this manner, it is no longer necessary to mount adjacent disc-shaped filter members with their inner circumference in an axially spaced apart relationship on a drum. As a result, the rotary disc filter device can be designed in a more compact manner. Furthermore, it is no longer necessary to provide a drum on which the disc-shaped filter members are to be mounted. When forming at least one of the walls of each disc-shaped filter member in the form of a frustum, it is possible to directly connect adjacent disc-shaped filter members to form the rotor. This simplifies the manufacture of the rotor. The rotor has less weight. As a result, a supporting structure for supporting the rotor can be manufactured at less expense.

The frustum may be a cone or a pyramid. Preferably the disc-shaped filter member has a form of a bifrustum, in particular a form of a bipyramid. A disc-shaped filter member having the form of a bifrustum and arranged symmetrical with respect to a plane extending perpendicular to the axis of rotation can be manufactured by using a small number of identical frame elements. Costs for manufacture of the rotary disc filter device can be saved thereby.

According to a preferred embodiment, the walls lie against each other at an outer circumference of the disc-shaped filter member, i. e. according to this embodiment a circumferential edge of the walls has not to be connected by a separate circumferential wall extending parallel to the axis of rotation. The abutting walls form an acute angle at the outer circumference of the disc-shaped filter member. This again simplifies the construction of the rotary disc filter device.

At least one of the walls is advantageously connected at its inner circumference with a further wall of an adjacent disc-shaped member. It is also possible that both walls are connected nearby its inner circumference with a further wall of an adjacent disc-shaped member. According to this embodiment, the disc-shaped members are arranged in a stack-like manner, each disc-shaped filter member being directly connected with an adjacent disc-shaped filter member. In the proposed arrangement, the provision of a drum on which the disc-shaped filter members are mounted, is not necessary.

In a further embodiment, resulting from the arrangement in a stack-like manner, a clearance is formed between adjacent walls of two disc-shaped members in a radial sectional view, the clearance increasing with a radial distance from the axis of rotation. An opening angle β between two adjacent walls may be in the range of 10° to 40°, preferably in the range of 15° to 35°. In the radial sectional view, the clearance is preferably symmetrical with respect to the plane extending perpendicular to the axis of rotation.

At least one of the walls arranged at an axial end of the rotor is preferably connected with a pipe section arranged coaxially with respect to the axis of rotation. Such pipe section serves to rotatably support the rotor in a support structure.

In a preferred embodiment, the wall is formed of a frame defining several openings therein, each opening being covered by a filter element. The frame may be formed at its inner circumference by a ring-shaped mounting plate extending in a radial direction or perpendicular direction, respectively, with respect to the axis of rotation. The ring-shaped mounting plate may have advantageously a circular inner breakthrough and a polygonal outer circumference. The proposed ring-shaped mounting plate is preferably used to connect adjacent disc-shaped filter members with each other. The adjacent disc-shaped filter members can be aligned in a proper manner by aligning the inner circular breakthroughs of the ring-shaped mounting plates and then by fixing the adjacent ring-shaped mounting plates, e. g. by the use of screws or bows with each other.

The frame may further comprise a plurality of spikes extending from the ring-shaped mounting plate, advantageously at an angle $\alpha$ of 160° to 185°. Radial outer ends of the spikes may be connected with an outer circumferential frame member. The frame may have an opening which is preferably limited by two spikes, an inner spike connecting plane and a section of the circumferential frame member. The manufacture of such a frame requires a small amount of identical frame elements. The proposed frame is simple in construction and can be manufactured at less expense.

According to a further embodiment, the filter element comprises a filter frame having a further inner circumference corresponding to the opening, the filter frame holding a filter cloth. The filter frame is preferably made of two further sheet metal elements. The further sheet metal elements are preferably connected by welding. They may also be connected by rivets of screws. It is also possible to produce the filter frame by a plastic material, e. g. by injection molding. The filter element can be made of one modules. This facilitates a mounting of the filter element and/or a replacement thereof.

DETAILED DESCRIPTION OF THE INVENTION

The invention will in the following be described in more detail with reference to the accompanying drawings which by way of example illustrate preferred embodiments of the invention.

A rotary disc filter device according to the present invention comprises a supporting structure 20 which rotatably supports a rotor 21 which is rotatable about an axis Ax of rotation.

Figure 2:
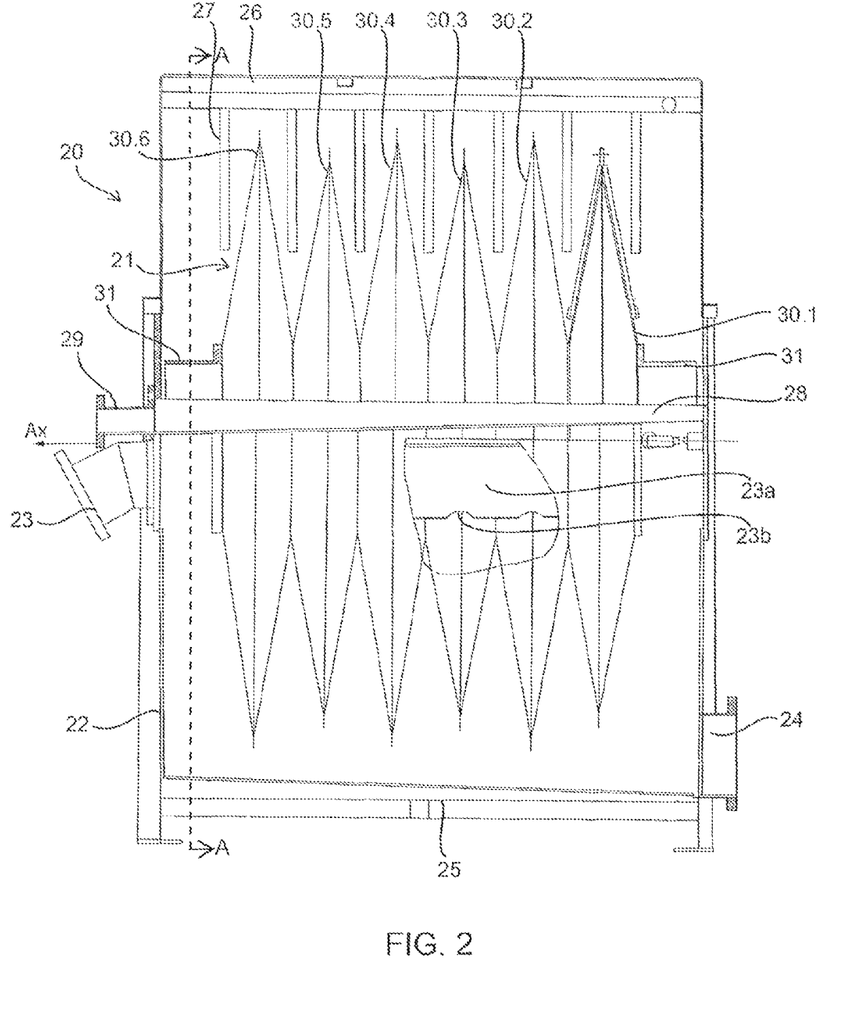
FIG. 2 is a partly broken up side view of a rotary disc filter device in accordance with the invention.

The support structure 20 comprises a housing 22 having an inflow port 23 arranged at one end side of the housing 22 in the vicinity of the axis Ax. The inflow port 23 is connected to an inflow pipe 23a extending through a central portion of the housing 22. The inflow pipe 23a, which is fixed at its both ends at the housing 22, has openings 23b arranged opposite to an interior of a disc-shaped filter member 30. The interior of the disc-shaped filter member 30 is formed by a space limited by opposing walls thereof. A discharge port 24 is arranged at the opposing end side of the housing 22 nearby a bottom 25 of the housing 22. From a cover 26 of the housing 22, there extend flush tubes 27 (not shown in detail here). Through a centre of the housing 22; there extends a discharge duct 28 which leads to a further outflow port 29 arranged nearby the axis Ax at the one end side of the housing 22.

Figure 3:
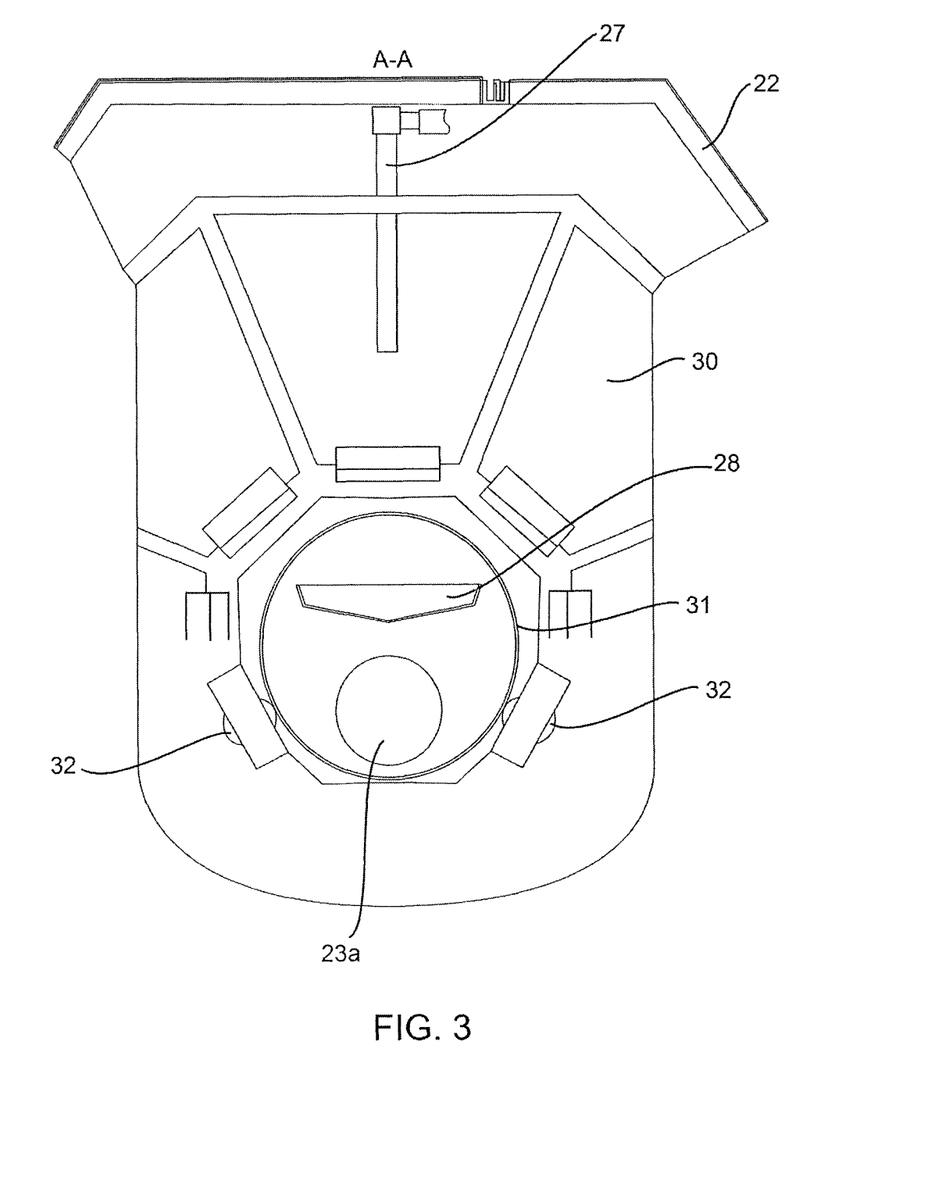
FIG. 3 is a sectional view according to section line A-A in FIG. 2.
Figure 4:
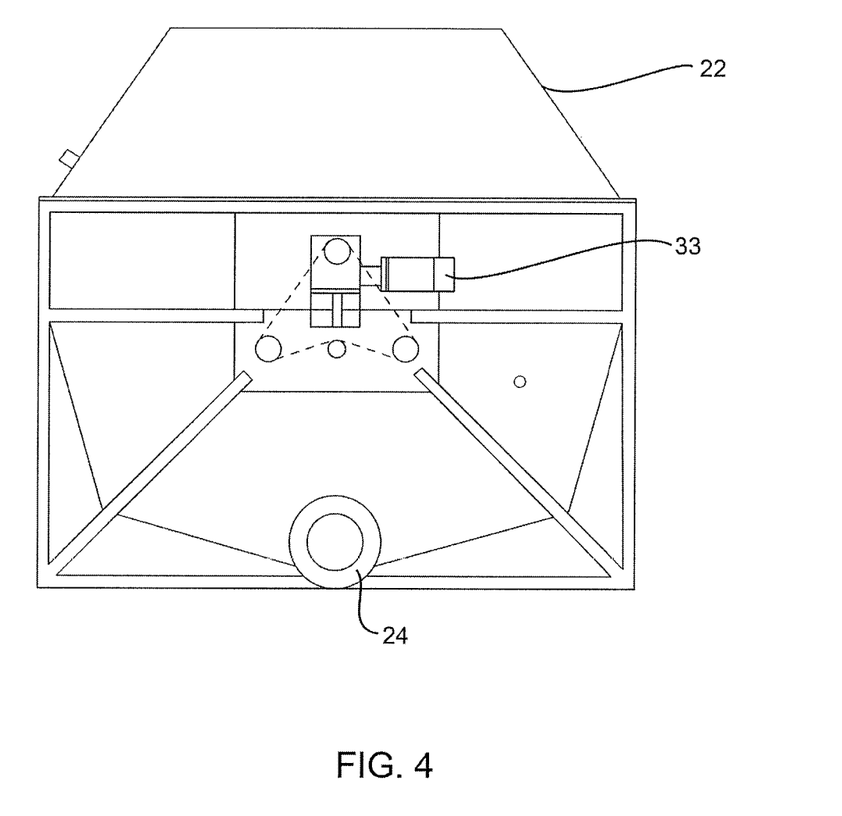
FIG. 4 is an end view of the rotary disc filter device in accordance with FIG. 2.

The rotor 21 comprises a plurality of the disc-shaped filter members 30 which surrounds the discharge duct 28 as well as the inflow pipe 23a. Each disc-shaped member 30 arranged at an axial end of the rotor 21 comprises a pipe section 31 extending in an axial direction thereof. As can be seen from FIG. 3, pipe sections 31 are supported on driving wheels 32 provided at the support structure 20. From FIG. 4, it can be seen that outside the housing 22 there is provided a driving unit 33 for driving the driving wheels 32 (not shown here).

Figure 5:
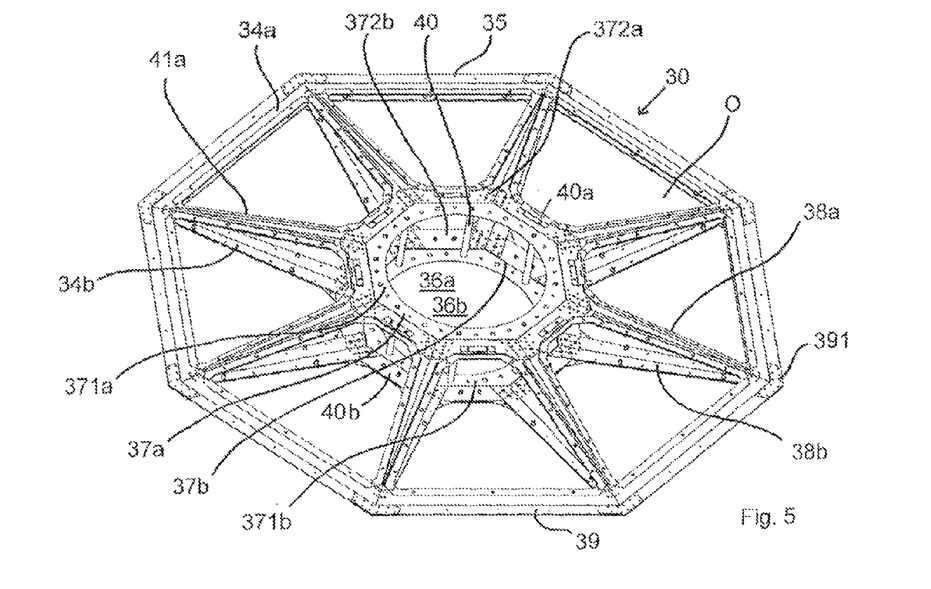
FIG. 5 is a perspective view of a disc-shaped filter member.
Figure 6:
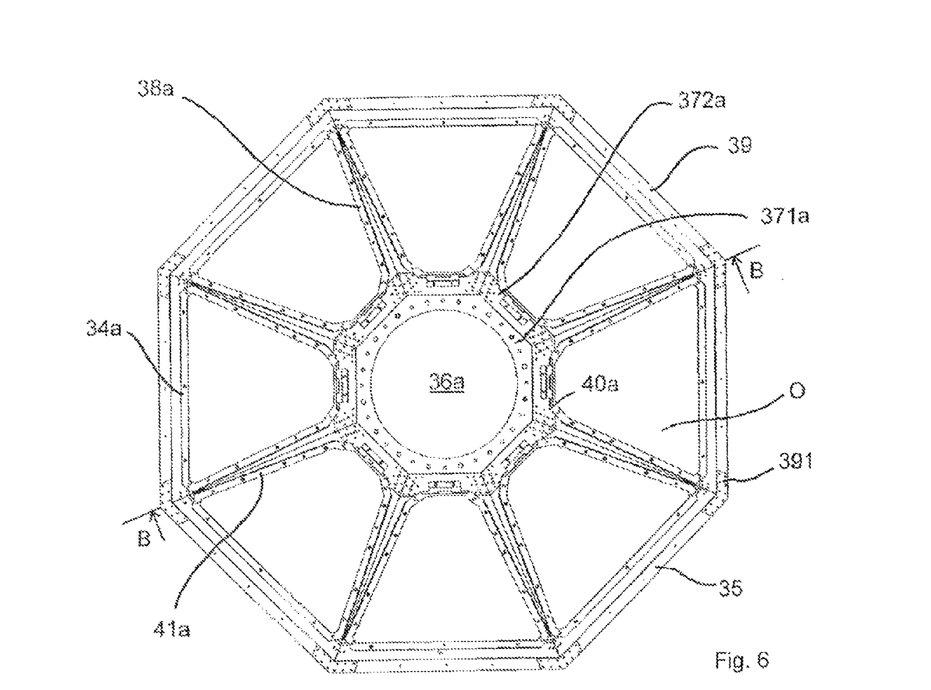
FIG. 6 is a top plane view according to FIG. 5.
Figure 7:
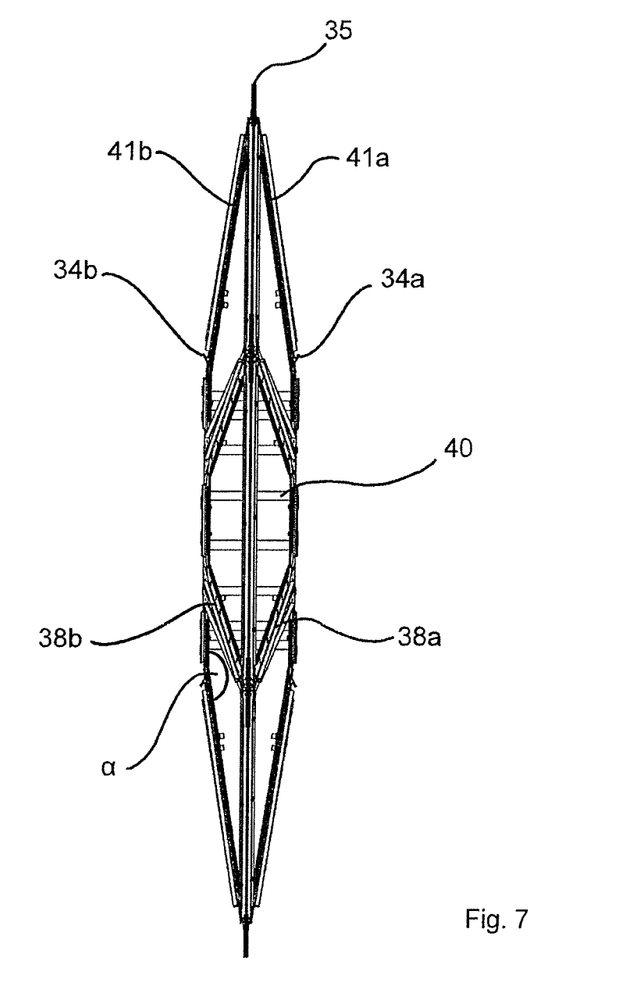
FIG. 7 is a sectional view according to section line B-B in FIG. 6.

With reference to FIGS. 5 to 7, there will now be described in detail an embodiment of a disc-shaped filter member 30. The disc-shaped filter member 30 is formed of two opposing walls 34a and 34b each of which has the form of a pyramidal frustum. Walls 34a and 34b abut against an outer circumference 35 (see FIG. 7). The disc-shaped filter member 30 has therefore the form of a pyramidal bifrustum. The pyramidal bifrustum may have 6 to 12 opposing pyramidal faces. In the shown embodiment, the pyramidal bifrustum has 8 opposing pyramidal faces. The disc-shaped filter member 30 comprises a frame which defines both opposing walls. The disc-shaped filter member 30 is advantageously made of a limited number of sheet metal elements which differ in shape.

Each wall 34a, 34b has a central breakthrough 36a, 36b which is formed within a ring-shaped mounting plate 37a, 37b. A central section 371a, 371b of the ring-shaped mounting plate 37a, 37b has a plane arranged perpendicular to the axis of rotation Ax in the mounted state. From the central section 371a, 371b, there extends an outer spike connecting section 372a, 372b at a first angle $\alpha$ of 160° to 185°.

Between the opposition central sections 371a, 371b, there may be provided axially running stiffeners 40. The stiffeners 40 may be made of cylindrical rods which may be fixed by screws. The stiffeners 40 may be arranged in an equal circumferential distance between the opposing central sections 371a, 371b. There may be arranged e. g. 6 to 12 of the stiffeners 40 running parallel to each other and to the axis of rotation Ax.

A polygonal outer circumference of the ring-shaped mounting plates 37a, 37b corresponds to the outer circumference 35 of the disc-shaped filter member 30. From each of the ring-shaped mounting plates 37a, 37b, especially the outer spike connecting sections 372a, 372b, there extend spikes 38a, 38b in an outer direction. Spikes 38a, 38b are made of sheet metal. The end portions of two opposing spikes 38a, 38b are connected to each other. Further, the end portions of spikes 38a, 38b adjacent to each other in a circumferential direction are connected by elongated circumferential frame members 39. For connecting the circumferential frame members 39, there are advantageously provided connecting plates 391. The provision of the connecting plates 391 makes it possible to manufacture the circumferential frame member 39 with a simple geometry and at less effort.

Each wall 34a, 34b comprises a plurality of openings O. Each opening O is defined by two spikes 38a, 38b, the circumferential frame member 39 as well as an inner spike connecting plate 40a, 40b connecting inner ends of the spikes.

Figure 7A:
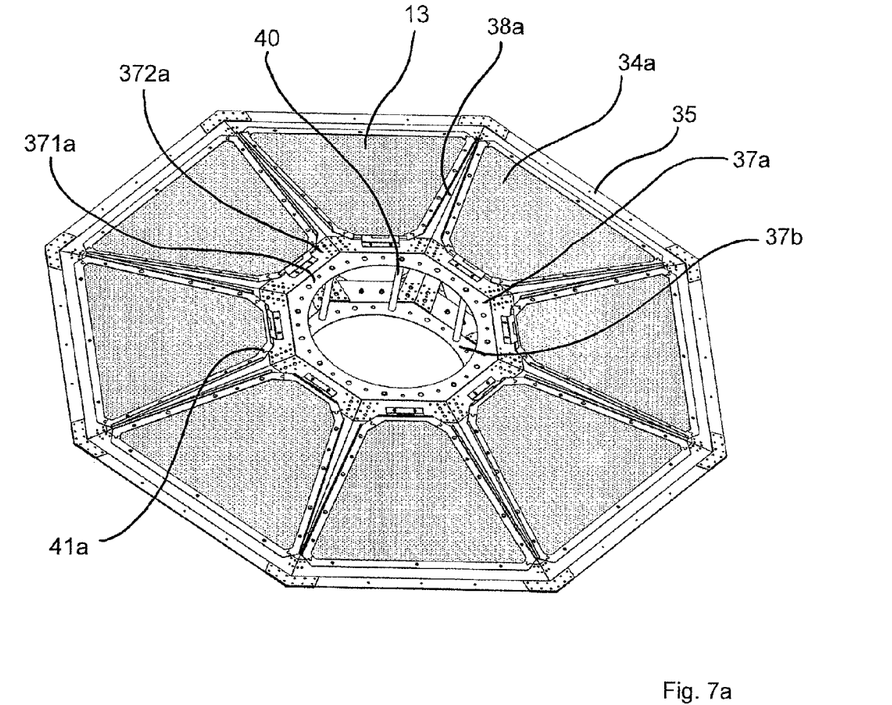
FIG. 7a is a perspective view of a disc-shaped filter member in accordance with FIG. 5 having filter cloths.

Reference numerals 41a and 41b, respectively, designate a filter frame holding the filter cloth 13 (see FIG. 7a). The filter cloth 13 may be made of stainless steel having a mesh in the range of 5 to 50 µm, in particular in the range of 10 to 30 µm. The filter frame 41a, 41b forms together with the filter cloth a filter element, which covers the opening O.

In a preferable embodiment the ring-shaped mounting plate 37a, 37b, the spikes 38a, 38b and the circumferential frame members 39 are made of sheet metal elements, which are preferably folded to enhance the stability thereof. The sheet metal elements are preferably made from stainless steel. They may have a thickness in the range of 1 mm to 10 mm. The sheet metal elements are preferably connected to each other by rivets. A disc-shaped filter member 30 shown in FIGS. 5 to 7 can be made by a small number of identical sheet metal elements which can be produced simply and at low expense. By the proposed manufacture of the disc-shaped filter member 30 of sheet metal elements the weight of the rotor 21 can be reduced remarkably.

Figure 8:
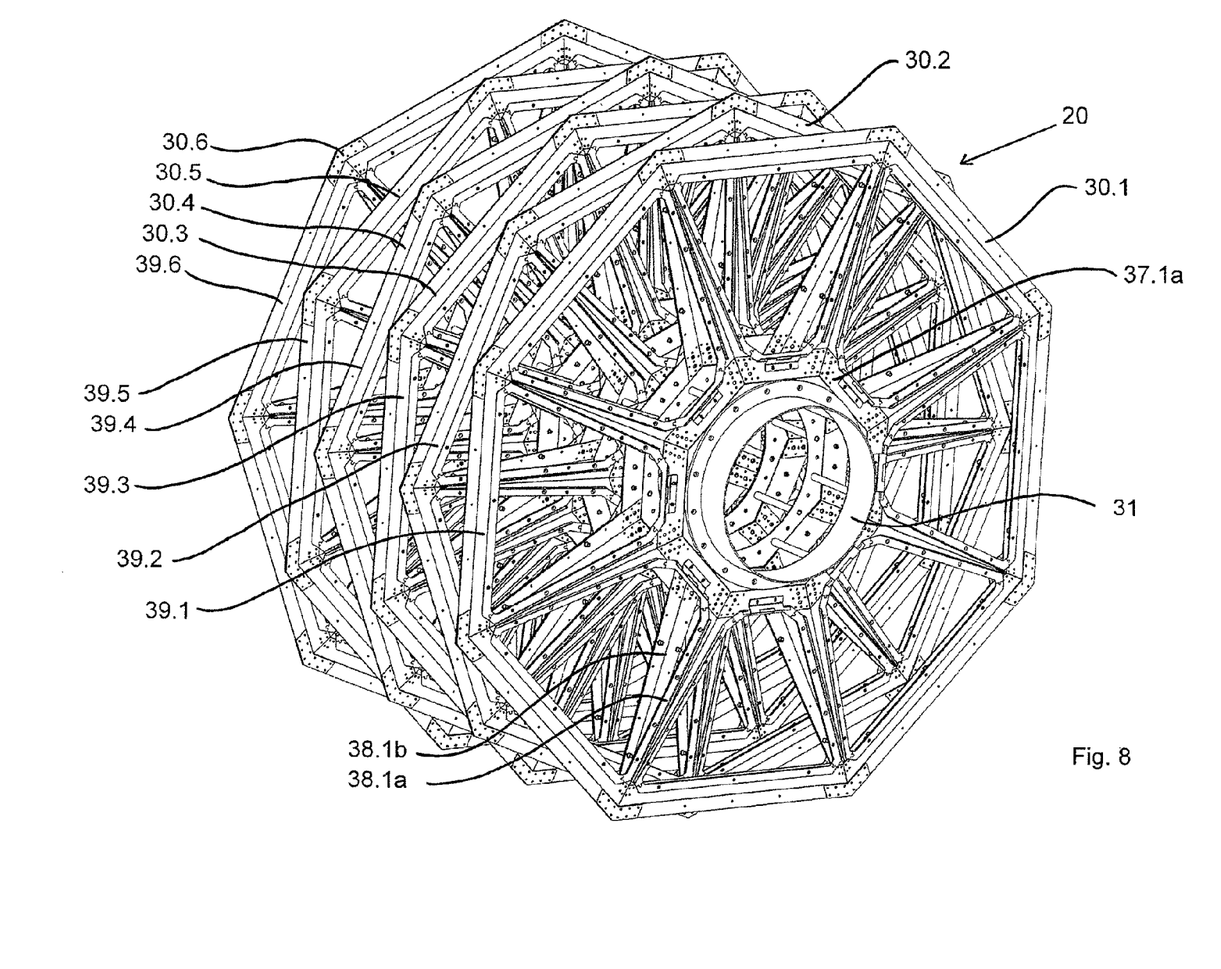
FIG. 8 is a perspective view of a rotor.
Figure 9:
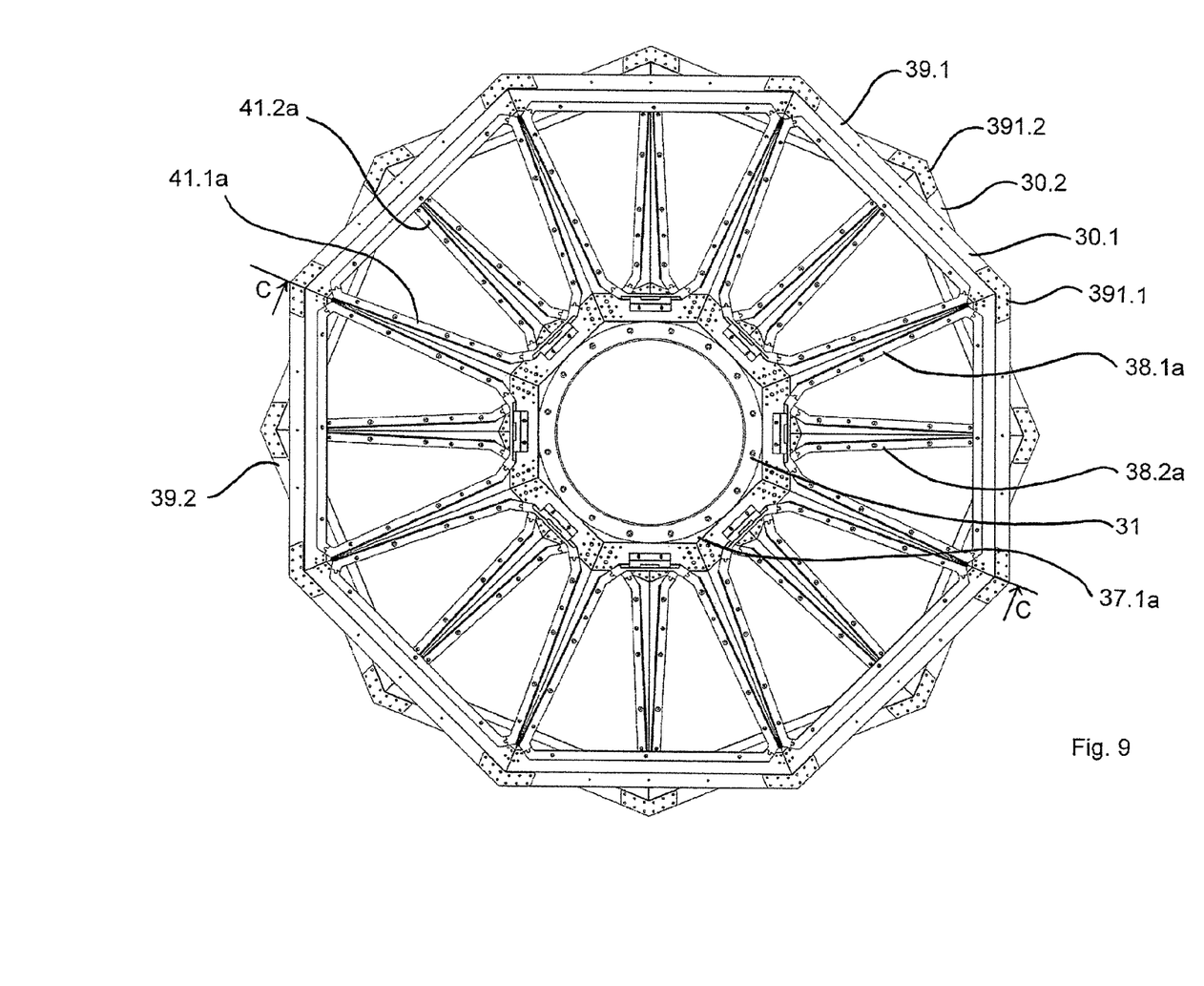
FIG. 9 is a top plane view according to FIG. 8.
Figure 10:
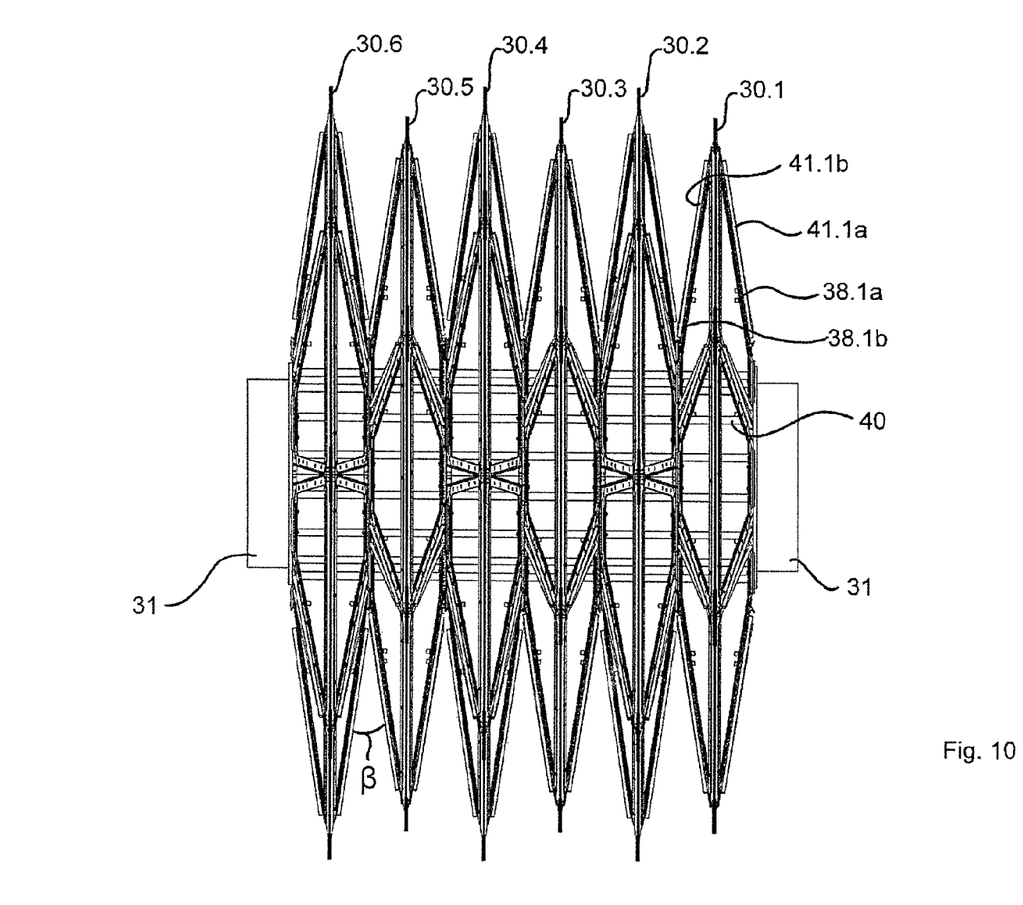
FIG. 10 is a sectional view according to section line C-C in FIG. 9.

FIGS. 8 to 10 show a preferable embodiment of a rotor 21 according to the present invention. The rotor 21 comprises a plurality of disc-shaped filter members 30.1 to 30.6 as shown in FIGS. 5 to 7. The disc-shaped filter members 30.1 to 30.6 are connected to each other with their ring-shaped mounting plates 37.1a, 37.1b, e. g. by the use of screws and nuts. As can be seen from FIGS. 8 to 10, adjacent disc-shaped filter members 30.1 to 30.6 are mounted to each other in such manner that the spikes 38.1a, 38.1b thereof are offset to each other. The spikes 38.1a, 38.1b of a first disc-shaped filter member 30.1 and third disc-shaped filter member 30.3 are in alignment with each other. The central breakthrough 36a, 36b of all disc-shaped filter members 30.1 to 30.6 are in alignment with each other forming a central channel circumventing the inlet pipe 23a as well as the discharge duct 28. The proposed offset arrangement of the polygonal disc-shaped filter members 30.1 to 30.6 results in a smooth rotational movement of the rotor.

The function of the rotary disc filter device according to the present invention is as follows:

Water to be cleaned is supplied via inflow port 23 to inflow pipe 23a. The water is discharged through openings 23b provided opposite the interior of each of the disc-shaped filter members 30.1 to 30.6. The water passes the filter cloth 13 held by filter frames 41a, 41b, 41.1a, 41.1b, 41.2a. Particles contained in the water adhere to an inner side of the filter cloth 13. When the rotor 21 rotates, the filter cloth 13 passes flush tubes 27 by which the particles adhering at the inner side of the filter cloth 13 are released and washed into the discharge duct 28. The particles are removed from the device via the further discharge port 29. The filtered water is discharged from the housing 22 via the discharge port 24.

As can in particular be seen from FIGS. 2 and 10, the disc-shaped filter members 30.1 to 30.6 have opposing walls 34a, 34b. In a radial sectional view, a clearance between the opposing walls of two adjacent disc-shaped members increases with a radial distance from the axis of rotation A. A second angle β between two adjacent walls may be in the range of 10° to 40°, preferably in the range of 15° to 35°.

The proposed design of the rotor 21 is compact. This allows an overall compact design of the rotary disc filter device.

Figure 11:
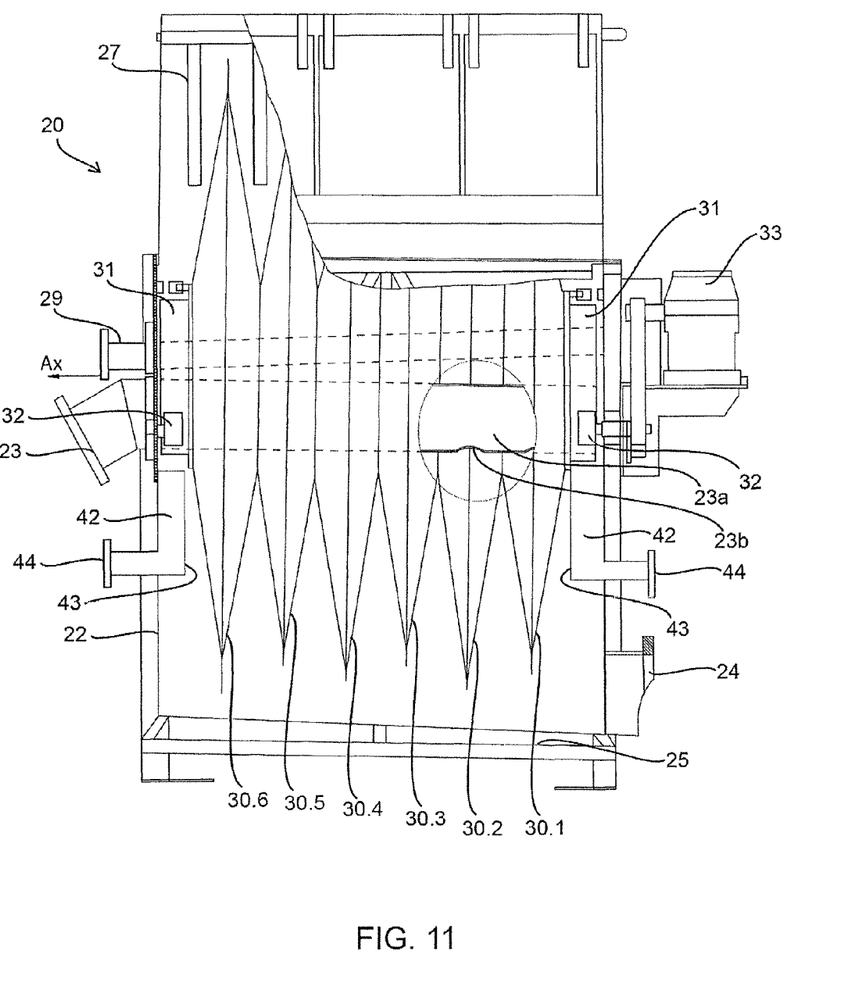
FIG. 11 is a partly broken up side view of a further rotary disc filter device in accordance with the invention.

FIG. 11 shows a partly broken up side view of a further rotary disc filter device. The further rotary disc filter device is similar to the rotary disc filter device shown in FIGS. 2 to 10, in particular shown in FIG. 2. The further rotary disc filter device differs from the rotary disc filter device shown in FIG. 2 in that in a lower portion of the housing 22, there are provided below the pipe sections 31 containers 42. The containers 42 are limited by the housing 22, the bottom 25 as well as separating walls 43. Each container 42 is provided with a bypass discharge duct 44.

The further rotary disc filter device has a bypass function. If e. g. discharge port 24 becomes clogged, water to be cleaned cannot be discharged through openings 23b. Water to be cleaned then escapes through a slit formed between pipe section 31 and housing 22. Said water is collected by containers 42 and discharged through bypass discharge ducts 44. By providing the containers 42, it is avoided that cleaned water collected in the lower part of the housing 22 is mixed with uncleaned water. In case of clogging of the discharge port 24, it is further avoided that the further rotary disc filter device is over flooded.

LIST OF REFERENCE SIGNS

1 Rotary disc filter
11 rotor
12 disc-shaped filter member
13 filter cloth
14 spray nozzle
15 flush tube
16 liquid-conducting tube
17 discharge duct
20 support structure
21 rotor
22 housing
23 inlet port
23a inflow pipe
23b opening
24 discharge port
25 bottom
26 cover
27 flush tube
28 discharge duct
29 further discharge port
30, 30.1 to 30.6 disc-shaped filter member
31 pipe section
32 driving wheel
33 driving unit
34a, 34b wall
35 outer circumference
36a, 36b central breakthrough
37a, 37b, 37.1a, 37.1b ring-shaped mounting plate
371a, 371b, 371.1a, 371.1b central section
372a, 372b, 372.1a, 372.1b outer spike connection section
38a, 38b, 38.1a, 38.1b spike
39, 39.1, 39.2 circumferential frame member
391, 391.1, 391.2 connection plate
40 stiffener
41a, 41b, 41.1a, 41.1b, 41.2a filter frame
42 container 43 separating wall
44 bypass discharge duct
A liquid
Ax axis of rotation
α first angle
β second angle
O opening

The invention claimed is:

1. A rotary disc filter device comprising:
a support structure comprising a housing, and
a rotor rotatable about an axis of rotation and rotatably supported by the support structure,
the support structure having an inflow port arranged at one end side of the housing in a vicinity of the axis of rotation, the inflow port being connected to an inflow pipe extending through a central portion of the housing and having openings arranged opposite to an interior of a disc-shaped filter member,
the rotor comprising a plurality of disc-shaped filter members, each of which having a central breakthrough, wherein the central breakthroughs are in alignment forming a central channel circumventing the inflow pipe and a discharge duct,
each disc-shaped filter member having two walls extending outwardly form the axis of rotation,
each wall being formed of a frame defining several openings therein, each opening being covered by a filter element,
wherein the frame is formed at an inner circumference by a ring-shaped mounting plate extending in a radial direction with respect to the axis of rotation,
wherein the disc-shaped filter member has a form of a bifrustum,
wherein the disc-shaped filter members are arranged to directly connect to each other with the ring-shaped mounting plate,
wherein each wall arranged at an axial end of the rotor is connected with a pipe section arranged coaxially with respect to the axis of rotation, and
wherein flush tubes extend from a cover of the housing.

2. The rotary disc filter of claim 1, wherein the bifrustum is a bipyramid.

3. The rotary disc filter of claim 1, wherein the two walls are connected to each other at an outer circumference of the disc-shaped filter member.

4. The rotary disc filter of claim 1, wherein a clearance is formed between adjacent walls of two disc-shaped members in a radial sectional view, the clearance increasing with a radial distance from the axis of rotation.

5. The rotary disc filter of claim 1, further comprising a plurality of spikes extending from the mounting plate, and having radial outer ends connected with an outer circumferential frame member.

6. The rotary disc filter of claim 5, wherein the frame has an opening defined by the two spikes, an inner spike connecting plate and a section of the circumferential frame member.

7. The rotary disc filter of claim 6, wherein the filter element comprises a filter frame having an inner circumference corresponding to the opening, the filter frame holding a filter cloth.

8. The rotary disc filter of claim 1, wherein the support structure further includes a first discharge port arranged on the housing below the rotor for discharging a liquid filtered through the plurality of disc-shaped filter members, and
the support structure is arranged so that the inflow port supplies the liquid to be filtered into the inflow pipe and out through the openings of the inflow pipe toward the plurality of disc-shaped filter members, and the first discharge port discharges the liquid filtered by the plurality of disc-shaped filter members to outside of the housing.

9. The rotary disc filter of claim 8, wherein the support structure further includes a second discharge port connected to the discharge duct, for discharging particles filtered from the liquid to the outside of the housing, the discharge duct extending through the central channel and being adjacent to the inflow pipe, and
the rotor rotates to position the particles, which is inside the plurality of disc-shaped filter member, adjacent to the flush tubes, the flush tubes release the particles from the plurality of disc-shaped filter members, and the discharge duct collects the particles and discharges the particles through the second discharge port.

10. The rotary disc filter of claim 9, wherein the frame further includes a plurality of spikes extending radially outwardly from the ring-shaped mounting plate and has outer end portions adjacent to each other in a circumferential direction,
wherein each of the disc-shaped filter members further includes a plurality of outer circumferential frame members located between the two walls and connecting the outer end portions of the plurality of spikes adjacent to each other at the respective two walls; and
stiffeners extending parallel to the axis of rotation and connecting the ring-shaped mounting plates of the two walls, the stiffeners being arranged at an equal circumferential distance around the central breakthroughs of the ring-shaped mounting plates.

11. The rotary disc filter of claim 10, wherein the filter element comprises a filter cloth and a filter frame holding the filter cloth, and
the filter element covers the opening defined by two of the spikes adjacent to each other, the ring-shaped mounting plate, and the outer circumferential frame members.

12. The rotary disc filter of claim 11, further comprising a container communicating with the inflow pipe for collecting the liquid to be filtered, and including a bypass discharge duct for discharging the liquid to be filtered from the inflow pipe to outside of the housing when the first discharge port cannot discharge the filtered liquid.

* * * * *